(12) United States Patent
Wilms et al.

(10) Patent No.: US 7,204,548 B2
(45) Date of Patent: Apr. 17, 2007

(54) OPEN ROOF CONSTRUCTION FOR A VEHICLE

(75) Inventors: Bernd Wilms, Brüggen (DE); Pascal Jozef Maria Feijts, Roermond (NL); Eric Spronk, Son (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 11/155,945

(22) Filed: Jun. 17, 2005

(65) Prior Publication Data

US 2005/0280289 A1   Dec. 22, 2005

(30) Foreign Application Priority Data

Jun. 21, 2004 (EP) .................. 04102848

(51) Int. Cl.
*B60J 7/00* (2006.01)
(52) U.S. Cl. .................................... 296/214
(58) Field of Classification Search ............... 296/214, 296/216.03, 143
See application file for complete search history.

(56) References Cited

U.S. PATENT DOCUMENTS

| | | | | |
|---|---|---|---|---|
| 4,978,165 | A * | 12/1990 | Schreiter et al. | 296/216.03 |
| 6,053,568 | A * | 4/2000 | Jambor | 296/213 |
| 6,517,149 | B2 * | 2/2003 | Hirschvogel et al. | 296/214 |
| 7,008,009 | B2 * | 3/2006 | Grimm et al. | 296/214 |

FOREIGN PATENT DOCUMENTS

| EP | 0 175 194 | 3/1986 |
|---|---|---|
| EP | 0 368 404 | 6/1989 |
| FR | 02 07683 | 12/2003 |

OTHER PUBLICATIONS

Communication from the European Patent Office for European patent application 04102848.1, dated Dec. 13, 2004, 7 pages.
Patent Abstracts of Japan, Publication No. 60248430, dated Sep. 12, 1985.
Patent Abstracts of Japan, Publication No. 60248431, dated Sep. 12, 1985.

* cited by examiner

*Primary Examiner*—Dennis H. Pedder
(74) *Attorney, Agent, or Firm*—Steven M. Koehler; Westman, Champlin & Kelly, P.A.

(57) ABSTRACT

An open roof construction for a vehicle includes a roof opening with longitudinal and transversal side edges provided in a stationary roof part of the vehicle. A closure mechanism is movable between a closed position for closing said roof opening and an opened position for opening said roof opening The stationary roof part and the closure mechanism each have a lower side facing a passenger compartment of the vehicle, which lower sides each are provided with a lining. The lining of the stationery roof part and the lining of the closure mechanism are integrally interconnected at a first transversal side edge of the roof opening towards which the closure mechanism will move when moving from the closed position towards the opened position, and wherein the closure mechanism is provided with guide mechanism for moving the closure mechanism lining relative to the closure mechanism and for leading an excess length of said closure mechanism lining in between said lining and the closure mechanism when the closure mechanism moves towards the opened position.

22 Claims, 2 Drawing Sheets

OPEN ROOF CONSTRUCTION FOR A VEHICLE

BACKGROUND OF THE INVENTION

The invention relates to an open roof construction or assembly for a vehicle, comprising a roof opening with longitudinal and transversal side edges provided in a stationary roof part of the vehicle and a closure mechanism, which is movable between a closed position for closing said roof opening and an opened position for opening said roof opening, wherein the stationary roof part and the closure mechanism each have a lower side facing a passenger compartment of the vehicle, which lower sides each are provided with a lining.

Generally, because the closure mechanism will move relative to the stationary roof part when moving from its closed position towards its open position and visa versa, the linings of the closure mechanism and of the stationary roof part are separate, non-connected parts. A disadvantage of such separate linings is, that seams are present between these two linings which negatively influence the esthetical appearance of the open roof construction.

SUMMARY OF THE INVENTION

In line with the above it is an object of the present invention to provide an improved open roof construction of the type referred to above.

Thus, there is provided an open roof construction or assembly for a vehicle, comprising a roof opening with longitudinal and transversal side edges provided in a stationary roof part of the vehicle and a closure mechanism which is movable between a closed position for closing said roof opening and an opened position for opening said roof opening, wherein the stationary roof part and the closure mechanism each have a lower side facing a passenger compartment of the vehicle, which lower sides each are provided with a lining portion. The lining portion of the stationary roof part and the lining portion of the closure mechanism are integrally interconnected at a first transversal side edge of the roof opening towards which the closure mechanism will move when moving from the closed position towards the opened position, and wherein the closure mechanism is provided with a guide mechanism for moving the closure mechanism lining portion relative to the closure mechanism and for leading an excess length of said closure mechanism lining portion in between said lining portion and the closure mechanism when the closure mechanism moves towards the opened position.

Because the lining portion of the stationary roof part and the lining portion of the closure mechanism are interconnected at the mentioned Transversal side edge of the roof opening, at least at that location no disturbing seam is present. The guide mechanism ensures that, notwithstanding the relative movement between the closure mechanism and the stationary roof part, the lining portion of the closure mechanism will remain in a position in which it properly lines the closure mechanism.

Preferably, said guide mechanism at least comprises a reversal member positioned near to the edge of the closure mechanism facing the second, opposite transversal side edge of the roof opening, and a drive mechanism for moving the excess length of the closure mechanism lining portion around said reversal member and in between the closure mechanism and its lining portion.

The reversal member ensures, that the excess length of the closure mechanism, which will be created when the closure mechanism moves towards its opened position, is positioned between the closure mechanism and its lining portion, such that it is not visible and cannot negatively influence the appearance of the closure mechanism (or open roof construction in its entirety). The drive mechanism is meant for moving the excess length of the closure mechanism lining portion around said reversal member.

Further, the reversal member may comprise at least one roller. But also, the reversal member may comprise a number of rollers positioned one aside another.

In one embodiment, the drive mechanism comprises a drive member which is movable longitudinally and which engages the free end of the excess length of the closure mechanism lining portion. The drive mechanism may move longitudinally (front to back) relative to the vehicle.

In yet a further embodiment, a tensioning mechanism, such as a tension spring or alike, is positioned between the drive mechanism and said free end. Such a tensioning mechanism ensures that the lining portion of the closure mechanism always will be taut in all positions of the latter.

As an example of a drive mechanism a drive cable driven by an electric motor may be mentioned.

It is generally known that a closure mechanism of an open roof construction may be movable by means of an electric motor. Thus, in accordance with one embodiment of the present invention, such an electric motor may be used for driving the closure mechanism as well as for driving the excess length of the closure mechanism lining portion.

Because the excess length of the closure mechanism lining portion moves around the reversal member, it will have a speed twice as large as the speed of the moving closure mechanism. Thus, appropriate transmission gears should be applied for ensuring that the electric motor will drive the closure mechanism and the excess length of the closure mechanism lining portion with corresponding different speeds.

As an alternative for the drive mechanism a rotatable winding member may be applied, such as a winding shaft or alike, attached to the closure mechanism for winding thereon the excess length of the closure mechanism lining portion.

Whereas, generally, the electric motor is attached to a stationary part of the vehicle, such a winding shaft will typically be attached to the closure mechanism and will move along therewith.

In one embodiment, the winding member is, pre-loaded in its direction for winding on, such that a separate drive member for the winding member is not needed.

Finally, said first transversal side edge of the roof opening may be the rear edge of the roof opening, as considered in the normal "forward" direction of movement of said vehicle. In such an embodiment, the closure mechanism will move rearwardly when moving from its closed towards its opened position. This is the common direction of movement for such a closure mechanism.

BRIEF DESCRIPTION OF THE DRAWINGS

Hereinafter the invention will be elucidated while referring to the drawing, in which embodiments of the open roof construction in accordance with the present invention are illustrated, where.

DETAILED DESCRIPTION OF THE ILLUSTRATIVE EMBODIMENTS

Figure 1:
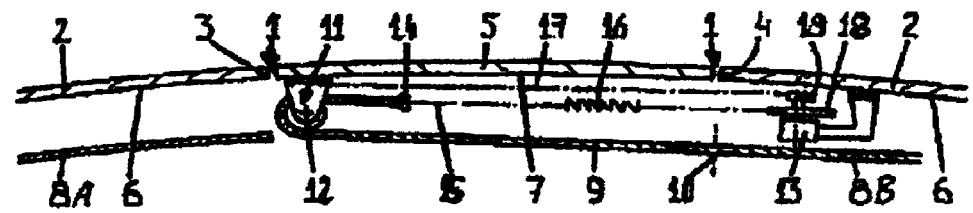
FIG. 1 shows, schematically, a longitudinal cross-section of an open roof construction in accordance with the present invention, in a closed position.
Figure 4:
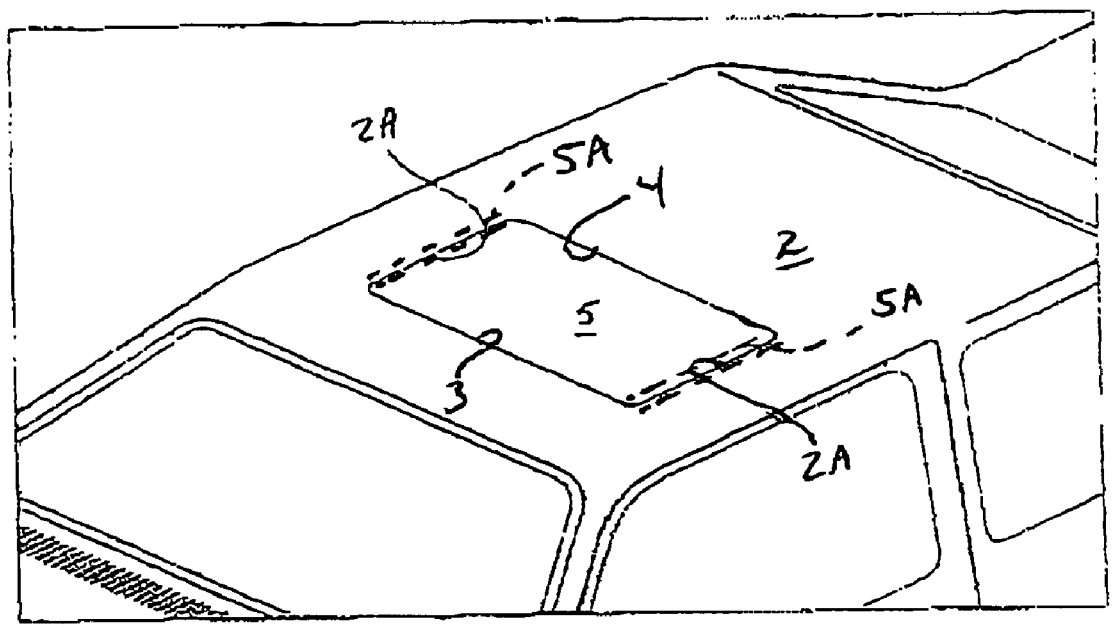
FIG. 4 shows, schematically, a top plan view of the open roof construction

Firstly referring to FIG. 1, part of an open roof construction or assembly for a vehicle is shown in a longitudinal cross-section. The open roof construction comprises a roof opening 1 (best seen in FIG. 2) provided in a stationary roof part 2 of the vehicle. Referring to FIG. 4, the roof opening 1 comprises two longitudinal side edges 2A and two transversal side edges 3 and 4. The shape of such a roof opening is well-known in the art In the illustrated embodiment transversal side edge 4 is the rear edge of the roof opening 1, as considered in the normal direction of "forward" movement of the vehicle.

The open roof construction further comprises a closure mechanism 5 (for example a panel) which is movable between a closed position (illustrated in FIG. 1) on guides 5A (FIG. 4) in which it closes said roof opening 1, and an opened position in which it opens said roof opening 1. Guides 5A and corresponding guide elements on closure mechanism 5 can take any number of well-known forms. It should also be noted that in the embodiment illustrated closure mechanism 5 moves above a portion of the stationary roof part 2 toward the opened position. However, it is not intended to limit the present invention to this type of open roof construction in that aspects of the present invention can be incorporated into open roof constructions where the closure mechanism travels below the stationary roof part 2.

The stationary roof part 2 has a lower side 6, whereas the closure mechanism correspondingly has a lower side 7.

The lower side 6 of the stationary roof part 2 is provided with a lining portion 8A, 8B which is attached thereto by a mechanism not shown in detail. Lining portion 8A is disposed below a forward section of the stationary roof part 2, while lining portion 8B is disposed below a rear section of the stationary roof part 2, both of which are intended to block a view of the lower side thereof from the passenger compartment. Suitable mechanisms for attaching lining portions 8A, 8B include but are not limited to framing members, fasteners, adhesives, etc. In a corresponding manner the lower side 7 of the closure mechanism 5 is provided with a lining portion 9 to block a view of the lower side thereof from the passenger compartment.

As is illustrated clearly in FIG. 1, the lining portion 8B of the stationary roof part 2 and the lining portion 9 of the closure mechanism 5 are integrally interconnected near to the transversal side edge 4 of the roof opening 1. The location of the integral interconnection (e.g. formed from a single unitary body) between both lining portions 8B and 9 (which, basically, can be an imaginary interconnection when both portions 8B and 9 are formed from a single unitary body) is indicated in FIG. 1 by a dotted line 10. Stated another way, portions 8B and 9 are integrally interconnected so that the lining as a whole extends under the transversal side edge 4 of the roof opening 2 towards which the closure mechanism 5 will move when moving from the closed position towards the opened position. Thus, it should be noted that portions 8B and 9 may be separate pieces that are joined together to form a continuous lining that extends under transversal side edge 4. In this manner, the actual location of the interconnection need not be proximate the transversal side edge 4. In a further embodiment, lining portions 8A, 8B and 9 can be formed from a single unitary body.

Connected to the closure mechanism 5 is a reversal member 11 comprising, for example, a roller 12. The free end of the lining portion 9 of the closure mechanism 5 extends around said roller 12 in the spacing between the lining portion 9 and the closure mechanism 5.

A drive mechanism, for example an electric motor 13, which is attached to a stationary part of the vehicle (for example the stationary roof part 2) connects to the free end 14 of the lining portion 9 by means of (in the present embodiment) a drive cable 15. Further, said drive cable 15 comprises a tensioning mechanism, such as a tension spring 16.

The electric motor 13 further connects to the closure mechanism 5, in the illustrated embodiment to the reversal member 11 which is attached to the closure mechanism 5, by mechanism of a second drive cable 17. The drive cables 15 and 17 cooperate with pulleys 18 and 19, respectively, connected to the electric motor 13.

In FIG. 1 the closure mechanism 5 assumes its closed position, in which the roof opening 1 is closed. The lining portion 9 extending around the roller 12 of the reversal member 11 (almost) engages the lining portion 8A of the stationary roof part 2 at the location of the forward transversal side edge 3 of the roof opening 1.

Figure 2:
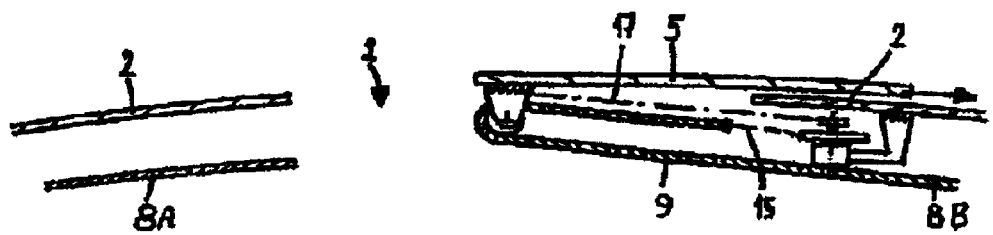
FIG. 2 shows in a view corresponding to FIG. 1 the open roof construction in a partly opened position.

When the closure mechanism 5 has to be moved towards an opened position, the electric motor 13 is activated, such that the drive cable 17 moves the closure mechanism 5 towards its opened position (to the right in FIG. 2). At the same time, drive cable 15 moves the excess length of the lining portion 9 of the closure mechanism 5 around the reversal roller 12 into the spacing between the lining portion 9 and the closure mechanism 5. Because the speed of the free end 14 of the excess length of the lining portion 9 is twice the speed of the closure panel 5, pulley 18 can have a corresponding larger diameter than pulley 19 to compensate for this difference.

Any slack of the excess length of the lining portion 9 positioned between the lining portion 9 and the closure mechanism 5 will be accommodated for by the tension spring 16.

FIG. 2 shows an intermediate position, in which the closure mechanism 5 already has moved partly towards its opened position. It is clearly visible, that part of the lining portion 9 has moved around the roller 12 into the spacing between the lining portion 9 and the closure mechanism 5. It is noted that in FIG. 2 the tension spring 16 has not been illustrated, but still will be present.

Figure 3:
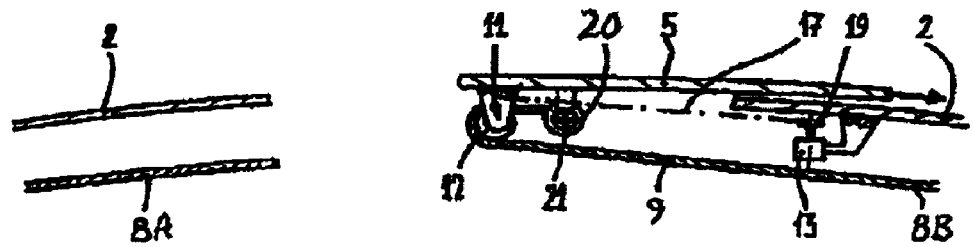
FIG. 3 shows, again in a corresponding view, an alternative embodiment of an open roof construction according to the present invention in a partly opened position.

FIG. 3 illustrates an alternative embodiment of the open roof construction in accordance with the present invention. In this embodiment the electric motor 13 only is meant for driving the closure mechanism 5 by mechanism of drive cable 17. Drive cable 15 has been omitted, and instead a rotatable winding member 20 is attached to the closure mechanism 5. Said rotatable winding member for example is a winding shaft, which is pre-loaded in its direction for winding thereon the excess length of the lining portion 9. Such a pre-load can be created by a torsion spring 21 or alike.

When the electric motor 13 is activated for moving the closure mechanism 5 from its closed position towards its opened position, the excess length of the lining portion 9 will be wound unto the rotatable winding member automatically. In an opposite sense, when moving the closure mechanism 5 again towards its closed position the excess length of the lining portion 9 of the closure mechanism 5 will be wound of from the winding member, until a position is reached which basically corresponds to the position of the lining portion 9 as illustrated in FIG. 1 of the previous embodiment.

The invention is not limited to the embodiments described before, which may be varied widely within the scope of the invention as defined by the appending claims.

What is claimed is:

1. An open roof construction for a vehicle, comprising:
   a stationary roof of the vehicle having longitudinal and transversal side edges so as to define a roof opening;
   a closure mechanism which is movable between a closed position for closing said roof opening and an opened position for opening said roof opening, wherein the stationary roof part and the closure mechanism each have a lower side facing a passenger compartment of the vehicle;
   a lining having a first portion disposed to block a view of the lower side of the stationary roof part from the passenger compartment and a second portion disposed to block a view of the lower side of the closure mechanism from the passenger compartment, wherein the first portion of the lining for the stationary roof part and the second portion of the lining for the closure mechanism are integrally interconnected so that the lining extends under a first transversal side edge of the roof opening towards which the closure mechanism will move when moving from the closed position towards the opened position, and wherein the lining is seamless proximate the first transversal side edge when viewed from a side of the lining where the lining blocks viewing of the closure mechanism and the stationary roof part; and
   a guide mechanism configured to move the second portion of the lining of the closure mechanism lining relative to the closure mechanism and for leading an excess length of said second portion of the lining of the closure mechanism into a space between said second portion of the lining of the closure mechanism and the closure mechanism when the closure mechanism moves towards the opened position.

2. The open roof construction according to claim 1, wherein said guide mechanism comprises a reversal member positioned near to an edge of the closure mechanism facing the transversal side edge of the roof opening that the closure mechanism moves away from when moving to the opened position, the open roof construction further comprising a drive mechanism adapted to move the excess length of the second portion of the lining of the closure mechanism around said reversal member and in between the closure mechanism and the second portion of the lining of the closure mechanism.

3. The open roof construction according to claim 2, wherein the reversal member comprises at least one roller.

4. The open roof construction according to claim 2, wherein the drive mechanism comprises a drive member which is movable longitudinally and which engages a free end of the excess length of the second portion of the lining of the closure mechanism.

5. The open roof construction according to claim 4, and further comprising a tensioning mechanism disposed between the drive mechanism and said free end of the excess length of the second portion of the lining of the closure mechanism.

6. The open roof construction according to claim 4, wherein the drive mechanism is a drive cable driven by an electric motor.

7. The open roof construction according to claim 6, wherein the closure mechanism is movable by means of the same electric motor as is used for driving the excess length of the second portion of the lining of the closure mechanism.

8. The open roof construction according to claim 2, wherein the drive mechanism comprises a rotatable winding member attached to the closure mechanism for winding thereon the excess length of the second portion of the lining of the closure mechanism.

9. The open roof construction according to claim 8, wherein the winding member is pre-loaded in a direction for winding the excess length of the second portion of the lining thereon.

10. The open roof construction according to claim 1, wherein said first transversal side edge of the roof opening is the rear edge of the roof opening, as considered in the normal direction of movement of said vehicle.

11. The open roof construction according to claim 1 wherein the first portion of the lining and the second portion of the lining are formed from a single unitary body.

12. The open roof construction according to claim 11, wherein said guide mechanism comprises a reversal member carried by the closure mechanism and positioned near to an edge of the closure mechanism facing the transversal side edge of the roof opening that the closure mechanism moves away from when moving to the opened position, the open roof construction further comprising a drive mechanism adapted to move the excess length of the portion of the lining around said reversal member and in between the closure mechanism and the portion of the lining of the closure mechanism.

13. The open roof construction according to claim 12, wherein the reversal member comprises at least one roller.

14. The open roof construction according to claim 12, wherein the drive mechanism comprises a drive member which is movable longitudinally and which engages a free end of the excess length of the portion of the lining of the closure mechanism.

15. The open roof construction according to claim 14, and further comprising a tensioning mechanism disposed between the drive mechanism and said free end of the excess length of the portion of the lining.

16. The open roof construction according to claim 14, wherein the drive mechanism is a drive cable driven by an electric motor.

17. The open roof construction according to claim 16, wherein the closure mechanism is movable by means of the same electric motor as is used for driving the excess length of the portion.

18. The open roof construction according to claim 12, wherein the drive mechanism comprises a rotatable winding member attached to the closure mechanism for winding thereon the excess length of the portion.

19. The open roof construction according to claim 18, wherein the winding member is pre-loaded in a direction for winding the excess length of the portion thereon.

20. The open roof construction according to claim 12, wherein said first transversal side edge of the roof opening is the rear edge of the roof opening, as considered in the normal direction of movement of said vehicle.

21. An open roof construction for a vehicle, comprising:
   a stationary roof of the vehicle having longitudinal and transversal side edges so as to define a roof opening;

a closure mechanism which is movable between a closed position for closing said roof opening and an opened position for opening said roof opening, wherein the stationary roof part and the closure mechanism each have a lower side facing a passenger compartment of the vehicle;

a lining having a first portion disposed to block a view of the lower side of the stationary roof part from the passenger compartment and a second portion disposed to block a view of the lower side of the closure mechanism from the passenger compartment, wherein the first portion of the lining for the stationary roof part and the second portion of the lining for the closure mechanism are integrally interconnected so that the lining extends under a first transversal side edge of the roof opening towards which the closure mechanism will move when moving from the closed position towards the opened position, and wherein the lining is seamless proximate the first transversal side edge when viewed from a side of the lining where the lining blocks viewing of the closure mechanism and the stationary roof part; and a guide mechanism carries the second portion of the lining to extend the second portion of the lining so as to block the view of the lower side of the closure mechanism.

22. The open roof construction of claim 21, wherein the guide mechanism comprises a roller carried by the closure mechanism.

* * * * *